United States Patent
Apolinari et al.

(10) Patent No.: US 12,129,953 B2
(45) Date of Patent: Oct. 29, 2024

(54) PIPE PROCESSING APPARATUS, PARTICULARLY FOR FORMING BRANCHES ON PIPES MADE OF THERMOPLASTIC MATERIAL

(71) Applicant: RITMO S.P.A., Teolo (IT)

(72) Inventors: Alessandro Apolinari, Cervarese Santa Croce (IT); Renzo Bortoli, Montegrotto Terme (IT)

(73) Assignee: RITMO S.P.A., Teolo (IT)

( * ) Notice: Subject to any disclaimer, the term of this patent is extended or adjusted under 35 U.S.C. 154(b) by 199 days.

(21) Appl. No.: 17/681,987

(22) Filed: Feb. 28, 2022

(65) Prior Publication Data

US 2022/0282818 A1    Sep. 8, 2022

(30) Foreign Application Priority Data

Mar. 2, 2021   (IT) .................. 102021000004826

(51) Int. Cl.
| | | |
|---|---|---|
| *F16L 47/28* | (2006.01) | |
| *B29C 65/00* | (2006.01) | |
| *B29C 65/02* | (2006.01) | |
| *B29C 65/78* | (2006.01) | |
| *B29L 31/24* | (2006.01) | |
| *F16L 47/02* | (2006.01) | |

(52) U.S. Cl.
CPC ............. *F16L 47/28* (2013.01); *B29C 65/02* (2013.01); *B29C 65/7841* (2013.01); *B29C 66/02242* (2013.01); *B29C 66/1224* (2013.01); *B29C 66/301* (2013.01); *B29C 66/52241* (2013.01); *B29C 66/53243* (2013.01); *F16L 47/02* (2013.01); *B29L 2031/246* (2013.01)

(58) Field of Classification Search
CPC .......... F16L 47/28; F16L 47/02; B29C 65/02; B29C 65/7841; B29C 66/02242; B29C 66/1224; B29C 66/301; B29C 66/52241; B29C 66/53243; B29C 65/2015; B29C 65/7802; B29C 66/02241; B29C 66/53241; B29C 66/8167; B29C 66/8222; B29C 66/8322; B29C 66/8414; B29C 66/73921; B29L 2031/246
See application file for complete search history.

(56) References Cited

U.S. PATENT DOCUMENTS

2017/0225386 A1* 8/2017 Tritt .................. B29C 66/81422
2018/0104907 A1   4/2018 Bortoli

FOREIGN PATENT DOCUMENTS

KR         20210024771 A  *  3/2021

* cited by examiner

*Primary Examiner* — S. Behrooz Ghorishi
(74) *Attorney, Agent, or Firm* — DUANE MORRIS LLP; Gregory M. Lefkowitz; Joaquin Hernandez

(57) ABSTRACT

A pipe processing apparatus, for forming branches on pipes made of thermoplastic material, including a base adapted to be fastened to the outer wall of a pipe and a supporting structure which extends from the base; a support member is slidingly associated with the supporting structure and is adapted to receive an interchangeable processing/handling means configured to interact with the pipe; the apparatus also includes a movement means which engages the support member in order to move it on command along a processing axis. The supporting structure includes a single elongated structural element.

15 Claims, 7 Drawing Sheets

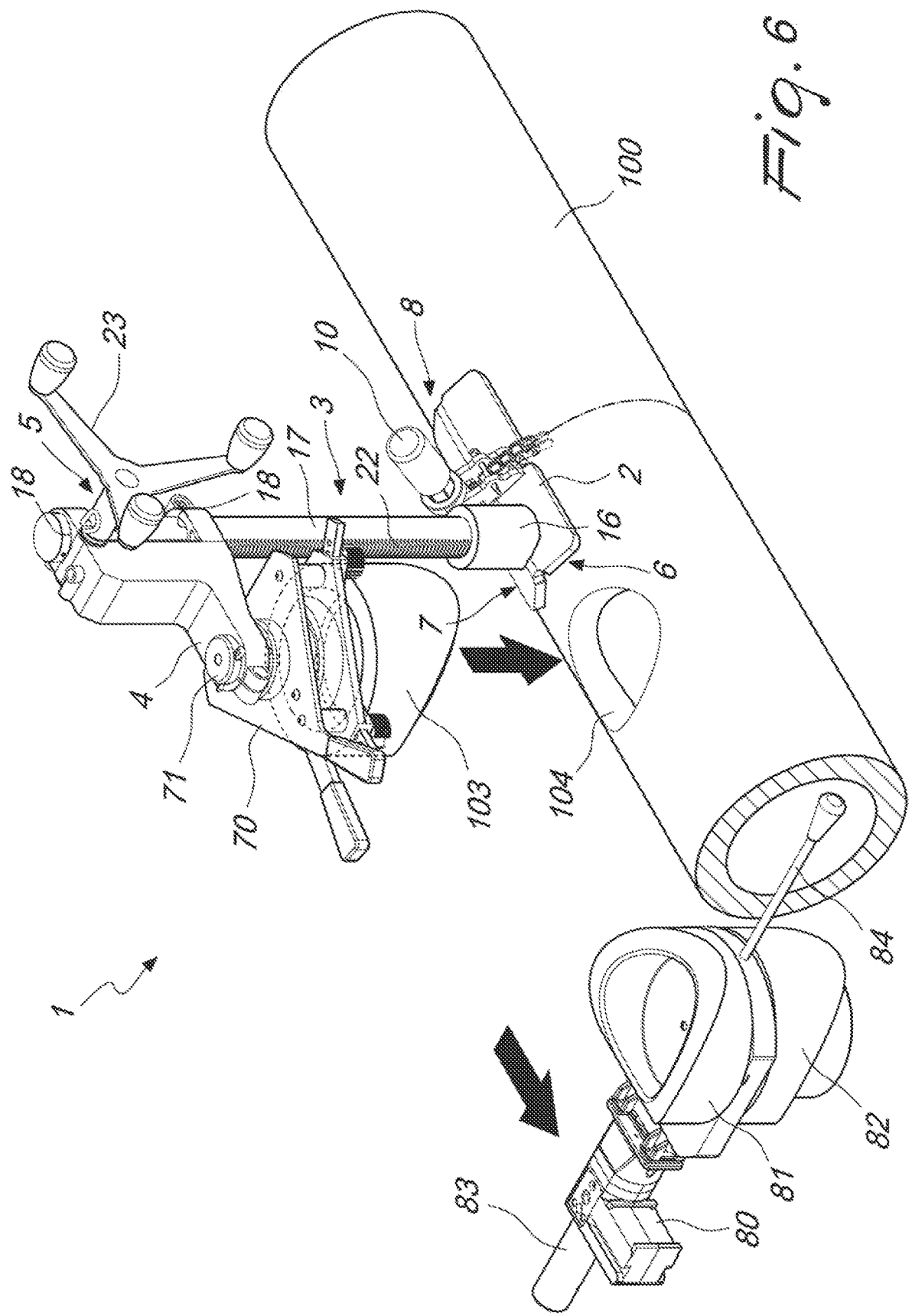

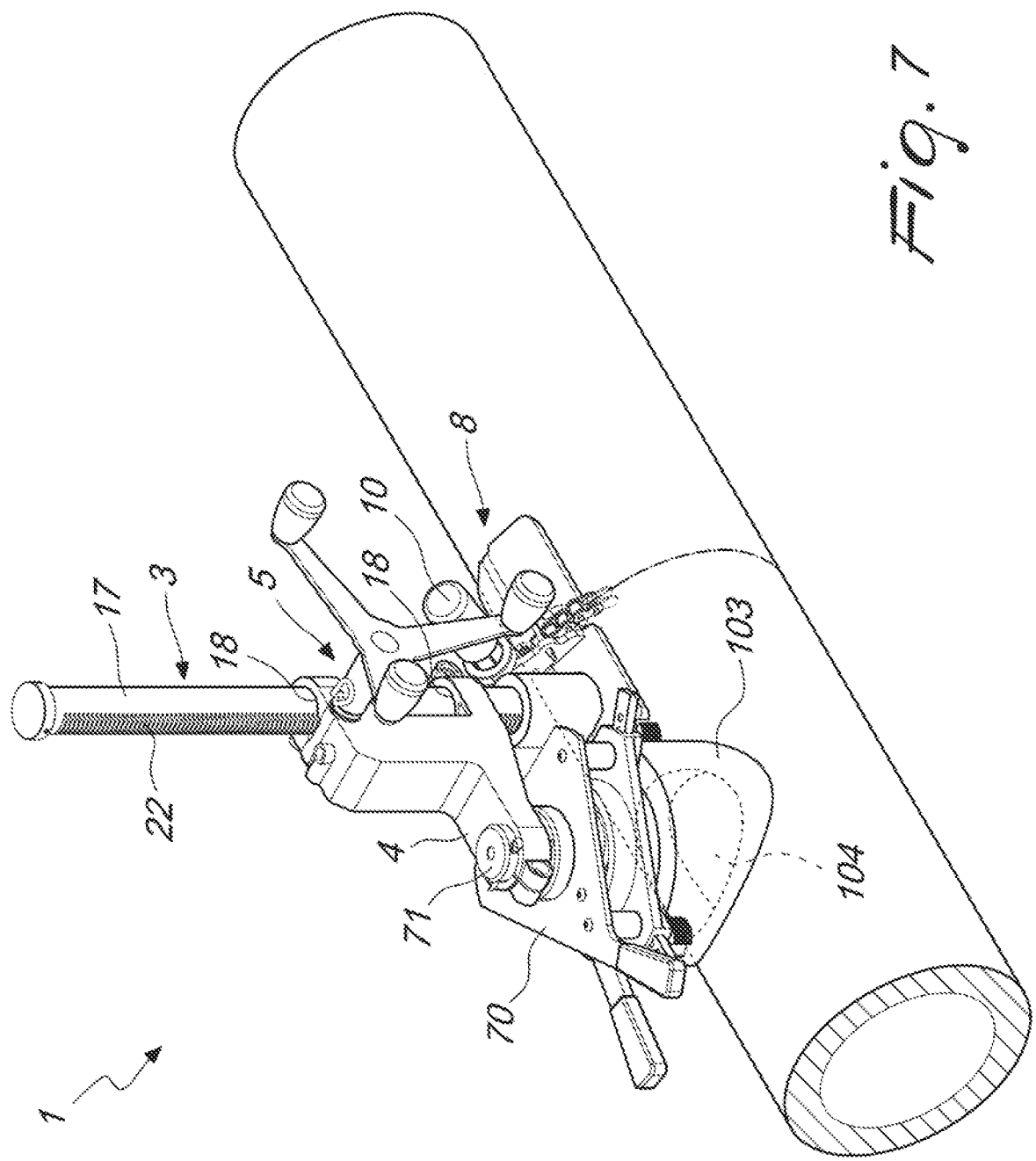

PIPE PROCESSING APPARATUS, PARTICULARLY FOR FORMING BRANCHES ON PIPES MADE OF THERMOPLASTIC MATERIAL

BACKGROUND

The present invention relates to a pipe processing apparatus, which is particularly used to form branches on pipes made of thermoplastic material.

More precisely, the present invention relates to an apparatus that allows, both in situ and during manufacturing, to weld saddle branch connectors to pipes made of thermoplastic material.

As is known, welding a saddle connector to a pipe requires various operating steps.

A first step consists in forming a hole in the pipe, taking care not to damage the side opposite to the hole site.

While performing the hole cutting operation, it is also important to try to ensure that the hole is perfectly radial with respect to the circumference of the pipe, in order to subsequently ensure a perfect welding operation.

Once the hole is correctly formed, the pipe and the connector are heated by means of a polywelder, on which heating bushings are mounted.

The heating bushings have a concave part which is designed to operate on the external surface and on the hole of the pipe to be provided with the branch. The heating bushings also have a convex part which operates on the connector that will form the branch.

In order to obtain a weld of good quality, it is important that, during the heating step, the surfaces of the bushings perfectly match with the surfaces of the pipe and of the connector.

Once the components to be connected are adequately heated, the polywelder is removed and the pipe and the connector are moved to mate, applying a balanced pressure on all the contact surfaces, keeping them pressed for an adequate time.

The joint is then made to cool to ambient temperature.

In order to facilitate the operations described above, adapted apparatuses have been devised which essentially include a supporting structure which can be coupled to the pipe and on which a sliding base is mounted which can be equipped alternately so as to be able to perform both hole cutting operations and welding operations.

The prior art apparatuses are not free from drawbacks, such as the fact that the supporting structure is generally composed of multiple separate posts, for example three posts arranged at the vertices of a triangle, that protrude from a flat base designed to be fastened to the pipe in some way.

Such a structure is evidently bulky and not easy to handle, especially at a building site in which it is often necessary to provide branches of this type.

It should also be noted that the movable base, that can be equipped with the various necessary instruments, must slide perfectly on multiple posts, while maintaining its parallel arrangement with the fixed base that can be associated with the pipe; that entails significant difficulties during the design and manufacture of the prior art systems, and this obviously affects the final cost of such devices.

A further problem of the prior art systems is that, in order to fasten the flat base to the cylindrical pipe, it is necessary to provide an adapter which substantially duplicates the shape of the pipe in a complementary manner.

This generally entails an increase in the space occupation of the apparatus.

Also, the saddle connectors generally have a geometry configured to mate with the shape of the pipe; their shapes depend on the diameter of the main pipe and on the diameter of the branch pipe.

Those geometric conditions entail that the saddle connector necessarily must be oriented in a single position with respect to the main pipe, since a different orientation would compromise a perfect mating.

However, according to the prior art, the saddle connector is retained in a fixed position with respect to the structure of the apparatus and this considerably complicates both the operations for heating the various components and the welding operations.

SUMMARY

The aim of the present invention is to provide a pipe processing apparatus, particularly for forming branches on pipes made of thermoplastic material, that overcomes the drawbacks of the cited prior art.

Within the scope of this aim, a particular object of the invention is to provide a pipe processing apparatus that is functional and compact but at the same time fully efficient, with an easy handling even in a building site.

A further object of the invention is to provide a pipe processing apparatus that allows to correctly perform all the operations required for the provision of welds, both in place and during construction, of saddle branch connectors made of thermoplastic material on pipes made of the same material.

A further object of the invention is to provide a pipe processing apparatus that is capable of reducing the possible vibrations, improving the quality of the final result and at the same time extending the lifespan of the apparatus.

A further object of the invention is to provide a pipe processing apparatus that is versatile and can be easily adapted to the dimensions of pipes and connectors, as well as being compact and simple to assemble for the operator.

Not least object of the invention is to provide a pipe processing apparatus that allows to obtain a perfect alignment of the connector with the pipe, at the same time ensuring better quality of the welds and a high production rate.

This aim, these objects and others which will become better apparent hereinafter are achieved by a pipe processing apparatus, particularly for forming branches on pipes made of thermoplastic material, comprising a base, adapted to be fastened to the outer wall of a pipe, and a supporting structure extending from said base; a support member being slidingly associated to said supporting structure and being adapted to receive an interchangeable processing/handling means configured to interact with said pipe; said apparatus comprising a movement means engaging said support member in order to move it on command along a processing axis; said supporting structure comprising a single elongated structural element.

BRIEF DESCRIPTION OF THE DRAWINGS

Further characteristics and advantages will become better apparent from the description of a preferred but not exclusive embodiment of a pipe processing apparatus, illustrated by way of non-limiting example in the accompanying drawings, wherein:

FIG. 6 is a view similar to the preceding one, showing the apparatus in a further step of operation;

FIG. 7 is a view similar to the preceding one, showing the apparatus in a further step of operation;

FIG. 8 is an enlarged-scale view of a detail of the pipe processing apparatus of FIG. 1.

DETAILED DESCRIPTION

Figure 1:
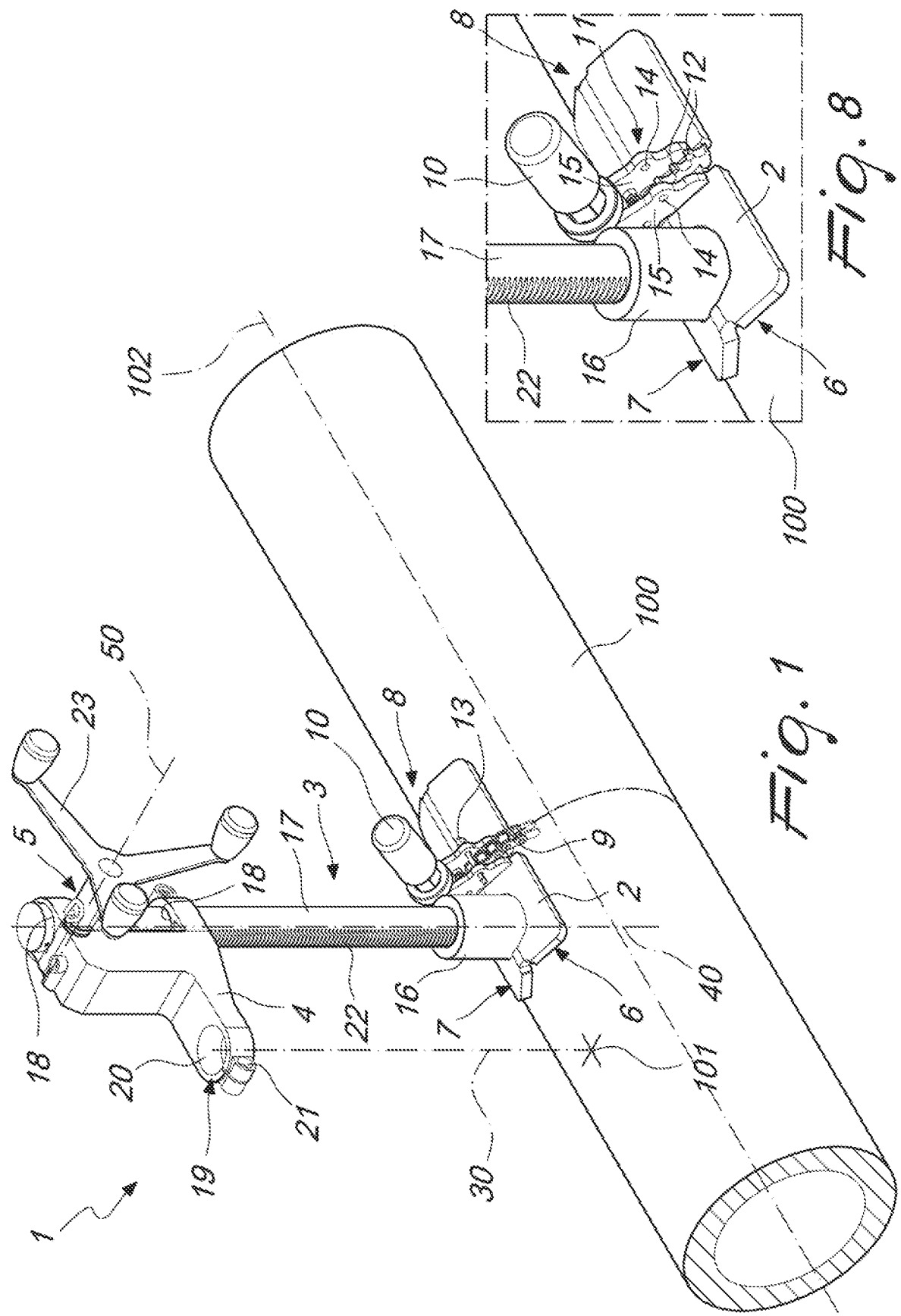
FIG. 1 is a perspective view of a pipe processing apparatus according to the invention shown fixed to a pipe.

With reference to the cited figures, the reference numeral 1 generally designates a pipe processing apparatus, adapted to provide branches on pipes made of thermoplastic material, preferably by using connectors of the saddle type.

It will be evident to the person skilled in the art, that the apparatus 1 may also be used with pipes made of a different material, as well as to perform other kinds of process.

The apparatus 1 has a base 2 which is adapted to be fastened to the external wall of a pipe 100 to be processed; a supporting structure 3 extends from the base 2.

A support member 4 is slidingly associated with the supporting structure 3 and is adapted to receive a processing/handling means which is interchangeable and configured to interact with the pipe 100.

The apparatus 1 also has a movement means 5 which engages the support member 4 in order to move it, on command, along a processing axis 30 which affects the pipe 100 at a processing point 101.

In the illustrated example, the base 2 is constituted by a metallic profiled element which has a substantially concave face 6, adapted to make contact, at least partially, with the external wall of the pipe 100, and a substantially convex face 7, which is normally directed toward the operator during use.

Advantageously, the profiled element that constitutes the base 2 has, in a transverse cross-section, a substantially polygonal, preferably V-like, shape.

This allows to rest and fix the base 2 to pipes with a wide range of diameters without making any modification to the apparatus 1, therefore extending its field of application and its operating functionalities.

Conveniently, the base 2 has a fastening means 8 for its fastening to the external wall of the pipe 100; the fastening means comprises a flexible member 9 having an end connected to a tensioning device 10; an opposite end can be coupled to an anchoring means 11.

The device 10 and the anchoring means 11 are securely joined to the profiled element that forms the base 2.

In practice, the tensioning device 10, which can be for example of the screw type, is configured to tighten the ring formed by the flexible member 9 around the pipe 100, ensuring that the base 2 does not move with respect to the set position.

Preferably, the flexible member 9 is constituted by a chain with articulated links which is adapted to at least partially wind around the external wall of the pipe 100, so as to lock the base 2 in cooperation with the tensioning device 10.

The choice to use a chain with articulated links is particularly advantageous, because it allows to extend the flexible member 9 with simple operations, according to the various operating requirements, making the apparatus 1 suitable for a wide range of diameters.

Preferably, the anchoring means 11 includes one or more protruding teeth 12, which protrude from the substantially convex face 7 of the profiled element that forms the base 2. The chain with articulated links meshes on the teeth 12.

Advantageously, the anchoring means 11 also has a safety pin 13 which can be inserted in corresponding holes 14 provided in containment walls 15 of the articulated link chain, between which the teeth 12 are interposed.

In practice, the holes 14 are arranged so as to allow the safety pin 13 to prevent the chain with articulated links from disengaging accidentally from the teeth 12.

The supporting structure 3 is fixed to a sleeve 16 which protrudes from the substantially convex face 7 of the profiled element that forms the base 2.

According to the present invention, the supporting structure 3 consists of a single elongated structural element 17, which is preferably shaped like a post.

The elongated structural element 17 is associated with the base 2 so that its longitudinal central axis 40 intersects the longitudinal central axis 102 of the pipe 100; therefore, the two axes 40, 102 lie on a same plane.

Such feature allows in particular to significantly reduce the vibrations generated during the execution of the processes performed on the pipe 100, thus improving the quality of the end result.

In the illustrated example, the longitudinal central axis 40 of the elongated structural element 17 is substantially perpendicular to the longitudinal central axis 102 of the pipe 100, and the two elements are mutually welded.

However, it will be evident to the person skilled in the art that, in different embodiments, not shown, the angle formed between the two axes may be broader or narrower, depending on the specific requirements, and the assembly methods also may be different.

Moreover, according to alternative embodiments, not shown in the figures, the elongated structural element 17 and the base 2 are constituted by bodies which are obtained separately and are mounted onto each other with the interposition of an adjuster means for adjusting the inclination of the central longitudinal axis 40 of the elongated structural element 17 with respect to the base 2.

In any case, the longitudinal central axis 40 of the elongated structural element 17 intersects the longitudinal central axis 102 of the pipe 100.

The elongated structural element 17 acts as a support and guide for the sliding of the support member 4 which engages thereon by means of adapted seats 18 which are mutually coaxial.

A fixing collar 19 is provided on the support member 4. The fixing collar 19 is provided with a substantially cylindrical cavity 20 adapted to receive a substantially cylindrical coupling portion of the processing/handling means.

The fixing collar 19 has a selective locking means 21, preferably constituted by a screw which allows to reduce the diameter of the cavity 20 until it locks by interference the coupling portion of the processing/handling means.

The movement of the support member 4, and therefore also of the processing/handling means, along the processing axis 30 is obtained by virtue of the movement means 5, which is preferably constituted by a rack 22 which extends parallel to the elongated structural element 17 and by a pinion, not shown in the figures, which meshes thereon.

The rack 22 is formed on the elongated structural element 17.

However, it will be evident to the person skilled in the art, that in alternative embodiments, not shown, the rack 22 can be constituted by a separate body, or can be replaced with other mechanisms, for example by a worm screw mechanism.

The pinion is rotatably fixed to the support member 4, with its axis of rotation 50 arranged transversely to the longitudinal central axis 40 of the elongated structural element 17, and is engaged with a control wheel 23 or with an equivalent device.

In practice, by acting manually on the control wheel 23, the support member 4 is made to move along the elongated structural element 17, advancing the processing/handling means toward the pipe 100.

As a function of the various steps of operation of the apparatus 1, the processing/handling means may also be mutually very different, although they share the presence of a coupling portion which can be mated with the cavity 20 of the fixing collar 19.

For example, during cutting a hole, the processing/handling means may consist of a drilling machine 60 provided with a neck which can be locked in the fixing collar 19 and equipped with a perforation/cutting tool, generally a hollow cutter 61.

As an alternative to the drilling machine 60, it is possible to use an adapter for drills, not shown in the figures, which supports the hollow cutter 61 and is actuated by means of an ordinary drill, or a power screwdriver.

As in the case of the drilling machine 60, the adapter for drills also is locked in the fixing collar 19.

During welding, the processing/handling means may consist of a chuck 70 which is adapted to lock tubular elements, such as in particular saddle connectors 103.

As regards this operating configuration of the apparatus 1, it is deemed useful to point out that by virtue of the constructive characteristics of the apparatus 1 and of the chuck 70, it is possible to rotatably associate the chuck 70 with the fixing collar 19; this is particularly advantageous both in the component heating step and in the subsequent welding step, as will become better apparent hereinafter.

In this regard, the chuck 70 includes a substantially cylindrical shank 71 which is adapted to allow its axial fixing to the support member 4 and simultaneously connect it to the support member 4 so that they can rotate angularly with respect to each other.

A pin 72, which can be inserted in a hole provided transversely in the shank 71, and a tightening of the screw 21, that is not complete but in any case sufficient to eliminate plays, allow to constrain the axial position of the chuck 70 without however locking its angular position.

The operation of the apparatus according to the invention is the following.

The apparatus is arranged on the pipe 100, so as to make the center of the fixing collar 19 coincide with the working point 101, and so that the base 2 is fixed to the external wall of the pipe 100, as shown substantially in FIGS. 1 and 8.

The fixing of the base 2 to the pipe 100 occurs essentially by gripping the pipe tightly with the flexible member 9, or with the chain with articulated links.

In practice, the first available link of the chain is arranged on the teeth 12 and fixed by means of the safety pin 13, and then the chain is tightened around the pipe 100 by acting on the tensioning device 10.

Figure 2:
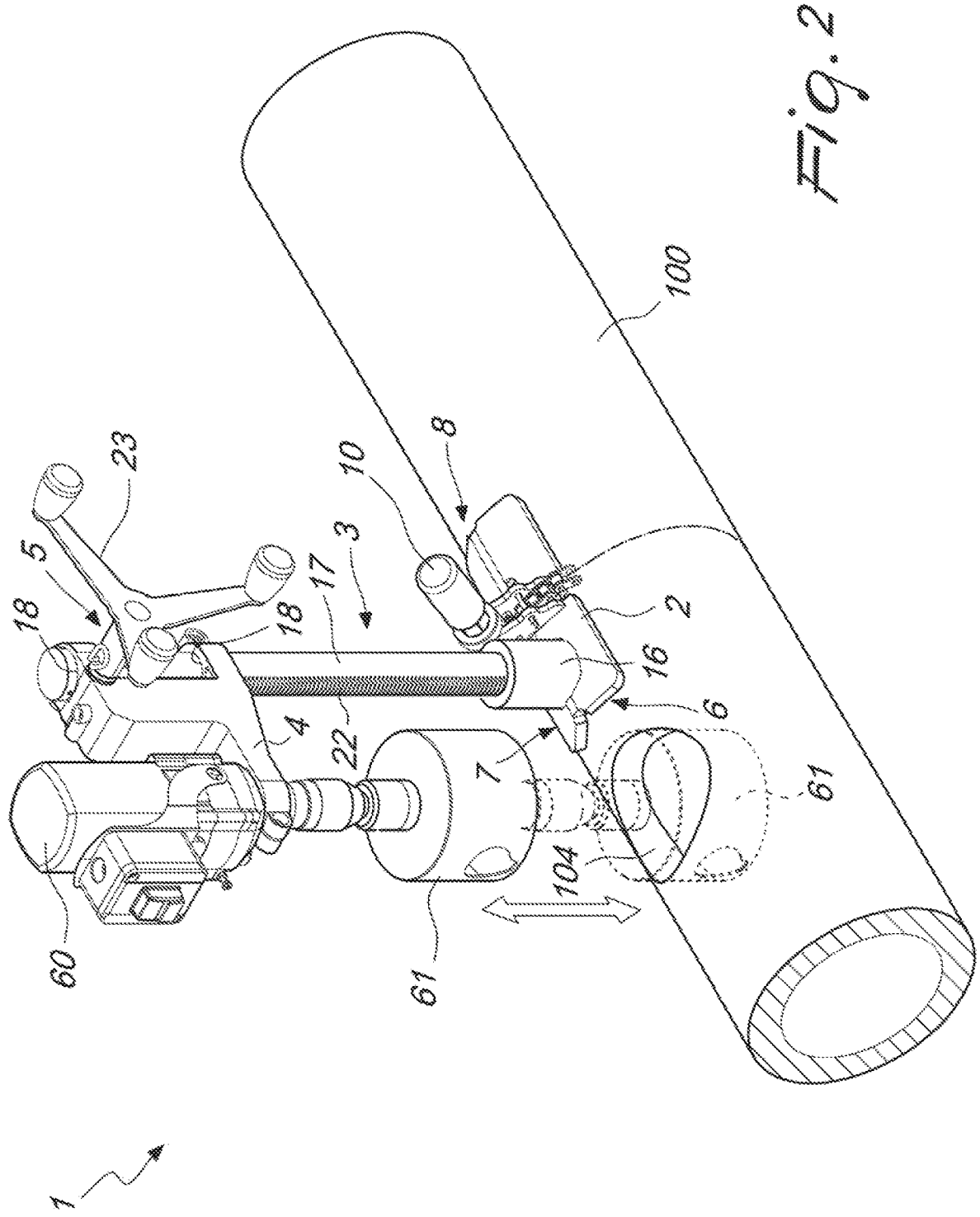
FIG. 2 is a view similar to the preceding one, showing the apparatus fixed to the pipe and equipped with a drilling machine, in a first step of operation.
Figure 3:
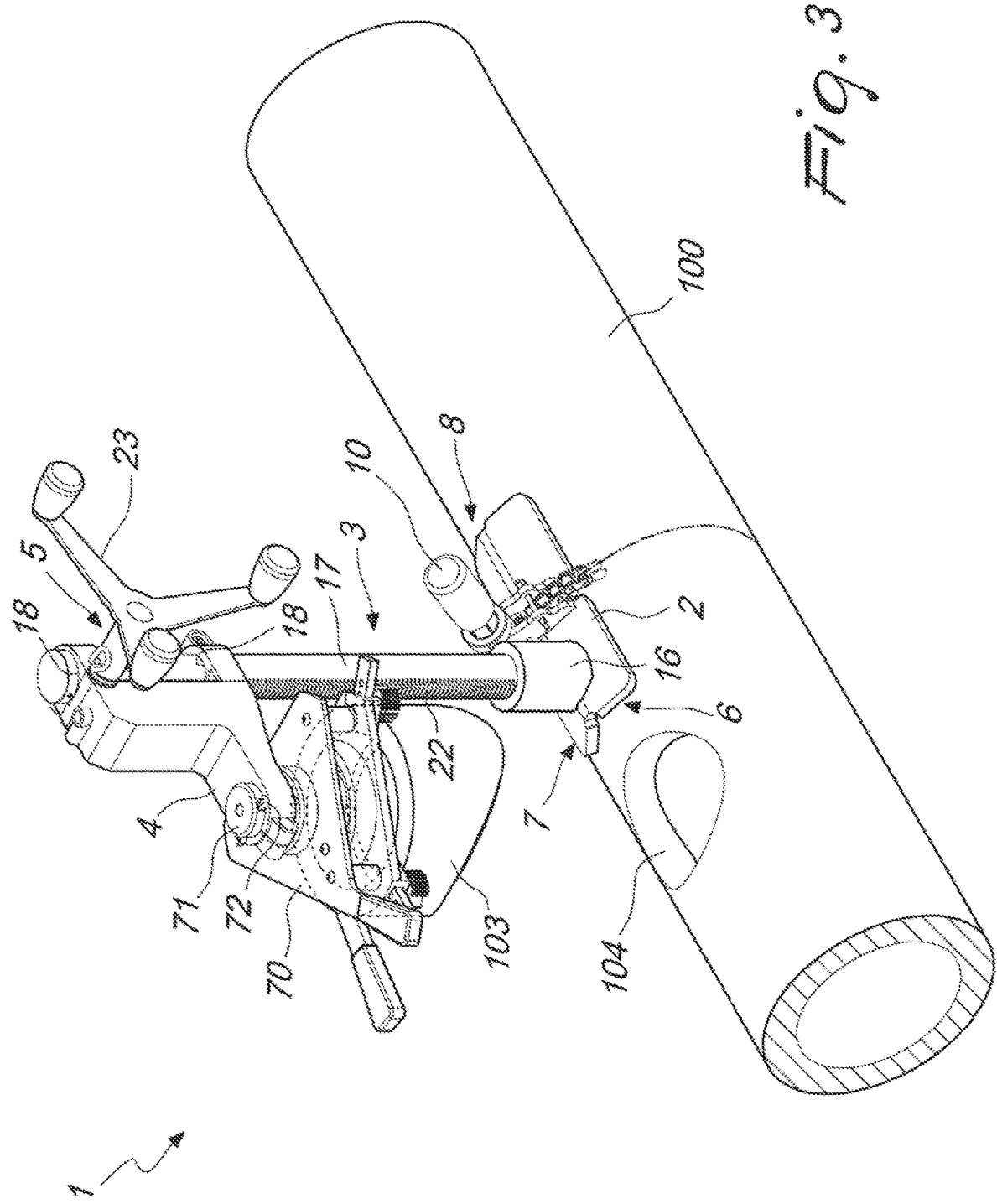
FIG. 3 is a view similar to the preceding one, showing the apparatus equipped with a chuck which supports a saddle connector, in a further operating step.
Figure 4:
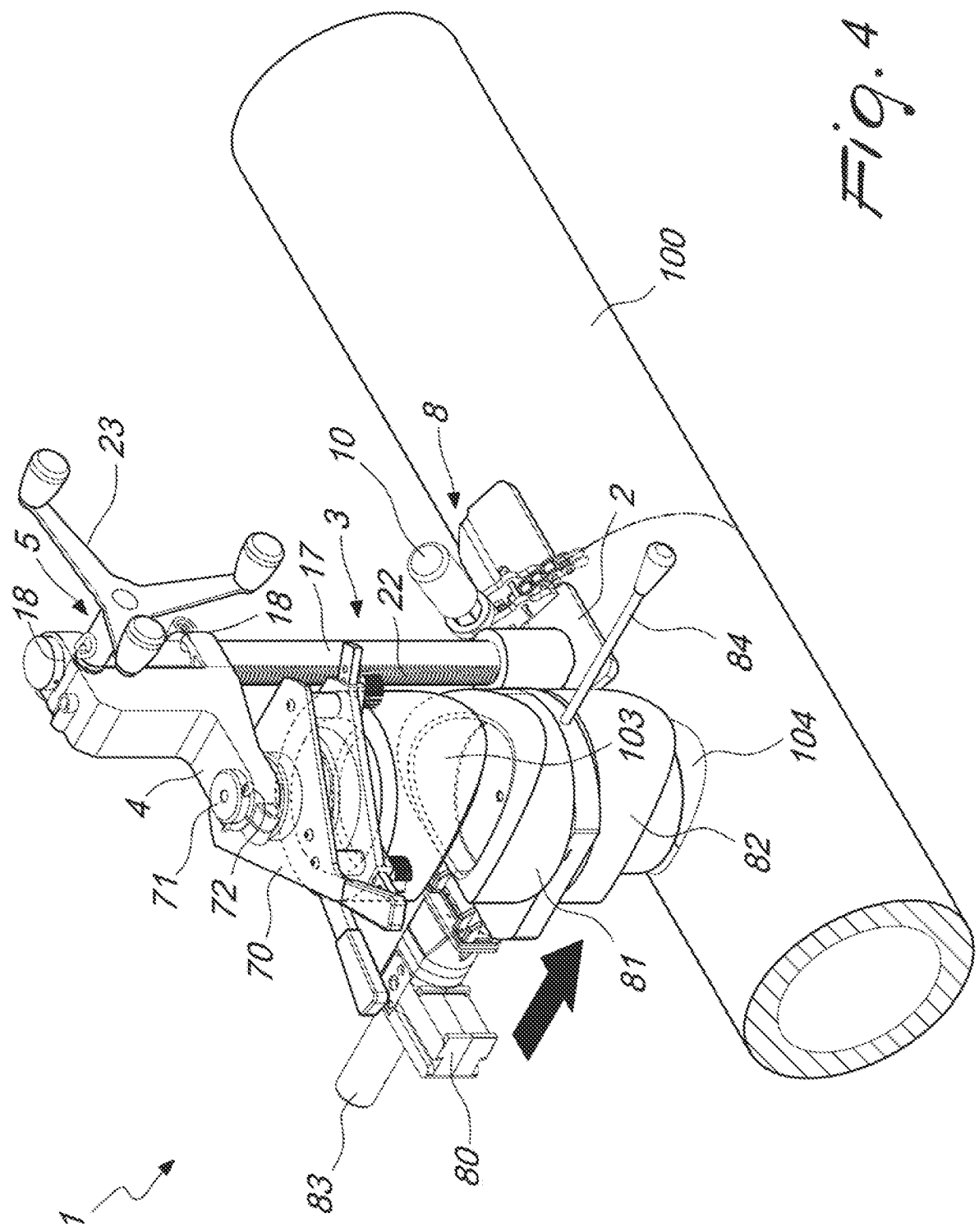
FIG. 4 is a view similar to the preceding one, showing the apparatus with a polywelder in a further operating step.

At this point, the neck of the drilling machine 60 is arranged in the fixing collar 19 and is locked by tightening the screw of the selective locking means 21, and the hollow cutter 61 is mounted on the drilling machine itself, as substantially shown in FIG. 2.

The drilling machine 60 is then started and the control wheel 23 is maneuvered so as to move the support member 4, and therefore the hollow cutter 61, closer to the pipe 100 in order to allow the provision of the hole 104.

Once the hole cutting step has been completed, the drilling machine 60 is turned off and removed from the fixing collar 19 after removing the hollow cutter 61.

The chuck 70 is then mounted on the support member 4, inserting the shank 71 in the fixing collar 19 and inserting the pin 72 in the corresponding hole provided in the shank 71 in order to avoid its fall.

Advantageously, the screw of the selective locking means 21 is screwed in, but not tightened completely, so as to eliminate plays but at the same time allowing the chuck 70 to rotate on the fixing collar 19.

The saddle connector 103 is then locked so that it is integral with the chuck 70 and is heated with a polywelder 80 provided with adapted heating bushings 81, 82, which is interposed and pressed between the hole 104 and the saddle connector 103, by maneuvering the control wheel 23, as substantially shown in FIGS. 2 to 5.

Figure 5:
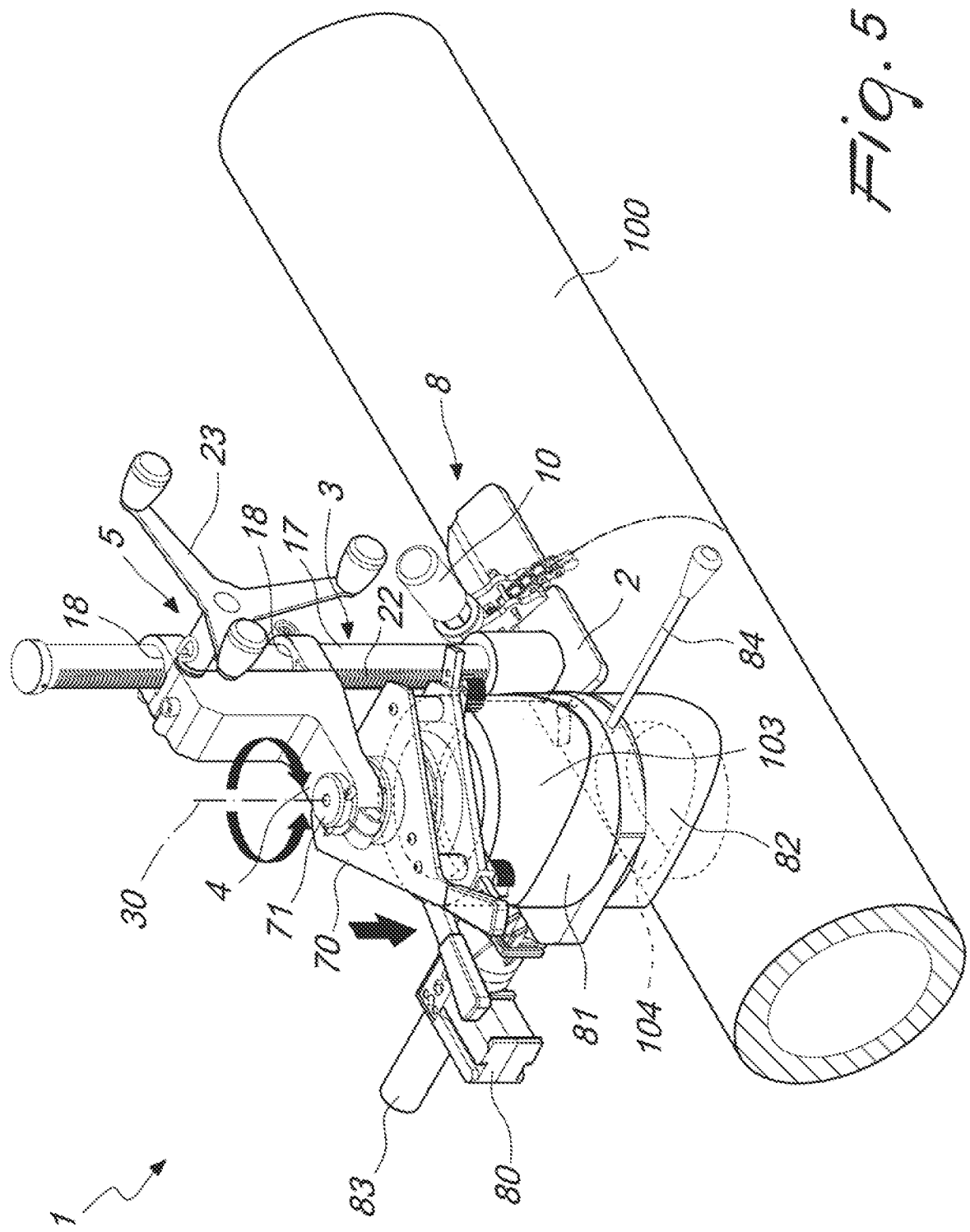
FIG. 5 is a view similar to the preceding one, showing the apparatus in a further operating step.

In this step, if necessary, it is possible to rotate the chuck 70 with respect to the apparatus 1 while keeping the polywelder 80 stationary, retaining it for example by means of handles 83, 84, so as to adapt the curved surfaces of the saddle connector 103 and of the pipe 100 to those of the heating bushings 81, 82, as substantially shown in FIG. 5.

Once the heating step has been completed, the support member 4 is rapidly raised, so as to allow the extraction of the polywelder 80 and the insertion of the saddle connector 103 in the hole 104 to complete the welding step, as substantially shown in FIGS. 6 and 7.

In this step also, if necessary it is possible to rotate the chuck 70 with respect to the apparatus 1, so as to adapt the curved surfaces of the saddle connector 103 to those of the pipe 100.

The possibility to rotate the chuck 70 with respect to the apparatus 1 is therefore particularly important, both during the heating step and during the welding step, since it allows the operator to accommodate correctly the saddle connector 103, first on the heating bushing 81 and then on the pipe 100.

This allows to obtain significant advantages in terms of quality of the end result, since it allows to obtain a perfect alignment of the saddle connector 103 with the pipe 100, at the same time ensuring a better quality of the welds and a high production rate.

It should also be noted that the pipe processing apparatus according to the invention is functional and compact, but at the same time fully efficient, demonstrating easy maneuverability even in a building site.

The pipe processing apparatus according to the invention is also advantageously capable of reducing the vibrations that may arise, further improving the quality of the end result and at the same time increasing the lifespan of the apparatus.

The pipe processing apparatus according to the invention is also versatile and can be easily adapted to the dimensions of various pipes and connectors.

The pipe processing apparatus according to the invention is also compact and simple to assemble for the operator.

In practice it has been found that the pipe processing apparatus according to the invention achieves the intended aim and objects.

This application claims the priority of Italian Patent Application No. 102021000004826 filed on Mar. 2, 2021, the subject matter of which is incorporated herein by reference.

The invention claimed is:

1. A pipe processing apparatus, particularly for forming branches on pipes made of thermoplastic material, comprising a base, adapted to be fastened to an outer wall of a pipe, and a supporting structure extending from said base; a support member being slidingly associated to said supporting structure and being adapted to receive an interchangeable processing/handling means configured to interact with said pipe; said apparatus comprising a movement means engaging said support member in order to move it on command along a processing axis; said supporting structure comprising a single elongated structural element.

2. The pipe processing apparatus, according to claim 1, wherein said elongated structural element is associated with said base so that its longitudinal central axis intersects the longitudinal central axis of said pipe.

3. The pipe processing apparatus according to claim 2, wherein said longitudinal central axis of said elongated structural element is substantially perpendicular to said longitudinal central axis of said pipe.

4. The pipe processing apparatus according to claim 1, wherein said base comprises a profiled element having a substantially concave face, adapted to at least partially make contact with said outer wall of said pipe, and a substantially convex face; said elongated structural element being fastened to a sleeve protruding from said substantially convex face.

5. The pipe processing apparatus according to claim 4, wherein said profiled element has a substantially polygonal transverse cross-section.

6. The pipe processing apparatus according to claim 1, wherein said base comprises a fastening means for fastening said base to said outer wall of said pipe.

7. The pipe processing apparatus according to claim 6, wherein said fastening means comprises at least one flexible member that has an end connected to a tensioning device that is joined to a profiled element; an opposite end that can be fastened to an anchoring means that is provided on said profiled element; said flexible member being adapted to at least partially surround said outer wall of said pipe so as to lock said base in cooperation with said tensioning device.

8. The pipe processing apparatus according to claim 7, wherein said anchoring means comprises one or more teeth which protrude from a substantially convex face of said profiled element and at least one safety dowel which can be inserted in corresponding holes provided on containment walls of said flexible member so as to avoid its accidental disengagement from said teeth; said flexible member being a chain with articulated links.

9. The pipe processing apparatus according to claim 1, wherein said support member comprises at least one seat adapted to slidingly receive said elongated structural element.

10. The pipe processing apparatus according to claim 1, wherein said support member comprises a fastening collar adapted to receive at least one coupling portion of said processing/handling means; said apparatus comprising a means for selective locking of said fastening collar to said coupling portion.

11. The pipe processing apparatus according to claim 1, wherein said movement means comprises a rack which extends parallel to said elongated structural element and a pinion which meshes with said rack, said pinion being associated with said support member and being engaged with a control wheel.

12. The pipe processing apparatus according to claim 1, wherein said processing/handling means belongs to the group constituted by: drilling machines, adapters for drills and/or screwdrivers, chucks for locking tubular elements.

13. The pipe processing apparatus according to claim 1, comprising at least one chuck for locking tubular elements which is rotatably coupled to said support member, said chuck comprising a cylindrical shank adapted to axially fix said chuck to said support member and to connect said chuck to said support member so that they are angularly rotatable with respect to each other.

14. A pipe processing apparatus, particularly for forming branches on pipes made of thermoplastic material, comprising a base, adapted to be fastened to an outer wall of a pipe, and a supporting structure extending from said base; a support member being slidingly associated to said supporting structure and being adapted to receive an interchangeable processing/handling means configured to interact with said pipe; said apparatus comprising a movement means engaging said support member in order to move it on command along a processing axis; said supporting structure comprising a single elongated structural element, wherein said base comprises a profiled element having a substantially concave face, adapted to at least partially make contact with said outer wall of said pipe, and a substantially convex face.

15. A pipe processing apparatus, particularly for forming branches on pipes made of thermoplastic material, comprising a base, adapted to be fastened to an outer wall of a pipe, and a supporting structure extending from said base; a support member being slidingly associated to said supporting structure and being adapted to receive an interchangeable processing/handling means configured to interact with said pipe; said apparatus comprising a movement means engaging said support member in order to move it on command along a processing axis; said supporting structure comprising a single elongated structural element, wherein said base comprises a fastening means for fastening said base to said outer wall of said pipe, and wherein said fastening means comprises at least one flexible member that has an end connected to a tensioning device that is joined to a profiled element, said flexible member being adapted to at least partially surround said outer wall of said pipe so as to lock said base in cooperation with said tensioning device.

* * * * *